Feb. 13, 1951

E. F. DE MERS 2,541,917

BAND SWITCHING ARRANGEMENT

Filed Dec. 17, 1947

INVENTOR.
Edward F. DeMers

BY T. L. Bowes

Atty.

Patented Feb. 13, 1951

2,541,917

UNITED STATES PATENT OFFICE 2,541,917

BAND SWITCHING ARRANGEMENT

Edward F. De Mers, Urbana, Ill., assignor to Stromberg-Carlson Company, a corporation of New York Application December 17, 1947, Serial No. 792,315

3 Claims. (Cl. 171—242)

The present invention relates to a band switching arrangement and more particularly to an improved band switching arrangement for use with a resonant frequency varying device employing a movable ferromagnetic core.

In recent years it has become common practice to employ variable inductances in the tuning circuits of wave signal receivers, to perform the same function as the variable condensers commonly employed in these circuits. These variable inductances often form a part of tank circuits, for example for use in oscillators or other circuits which require resonant frequency varying devices, and in which one element of the tank circuit comprises a fixed capacitor. Variations in inductive reactance are obtained by changing the relative positions of a winding and movable core formed of a compressed comminuted ferromagnetic material, often referred to as a "powdered iron" core.

It is, of course, desirable that a substantial change of inductance occurs as the relative positions of the winding and its associated ferromagnetic core are changed. The method of tuning a circuit by changing the relative position of such a ferromagnetic core and an associated winding is commonly called permeability tuning.

It is a well known fact that the resonant frequency of a circuit tuned to parallel resonance may be expressed by the following equation:

$$f=\frac{1}{2\pi\sqrt{LC}}$$

where $f$ is the frequency in megacycles per second, L is the inductance in microhenrys and C is the capacitance in microfarads. By varying the value of the inductance L while permitting the value of the capacitance C to remain constant, the resonant frequency $f$ is varied. From the above equation it is clear that the frequency varies inversely as the square root of the inductance and consequently if the inductance changes by a factor of nine the resonant frequency which it is desired to vary will change only by a factor of three.

Unfortunately, ordinary variable inductances of the movable ferromagnetic core type do not provide a sufficient change in inductance to provide the wide ranges of resonant frequency variation required in modern wave signal receivers, which receivers may be capable of receiving signals in the standard broadcast band, the short wave band, and the frequency modulation band—in fact in some cases even including the television band. Accordingly it has been common practice to employ a plurality of separate tuned circuits, one for each band, with selectively operable band switching means for rendering the proper tuned circuit effective when it is desired to tune in a signal within the associated band. As a matter of fact in conventional permeability tuned receivers the resonant frequency increases approximately by a factor of three as the ferromagnetic core moves from the "core-all-in" position to the "core-all-out" position. For the standard broadcast band, this has been very adequate since the frequency range of the standard broadcast band generally extends from 550 kilocycles to 1550 kilocycles. It would be desirable to provide a variable inductance which could be employed in connection with tuned circuits whereby the resonant frequency may change by a factor substantially greater than three without the requirement of additional tuned circuits or the like.

Accordingly, it is an object of the present invention to provide a new and improved resonant frequency varying device whereby a wide range of resonant frequencies may be obtained in a relatively simple manner.

It is another object of the present invention to provide a new and improved variable inductance of the type employing a movable ferromagnetic core in which a very wide range of inductive reactance is obtainable, in a simple and inexpensive manner.

Still another object of the present invention is to provide a new and improved permeability tuned circuit in which band switching may be obtained in a simple manner using the same coil and the identical capacitance for a plurality of different bands.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawing, in which.

Figure 1:
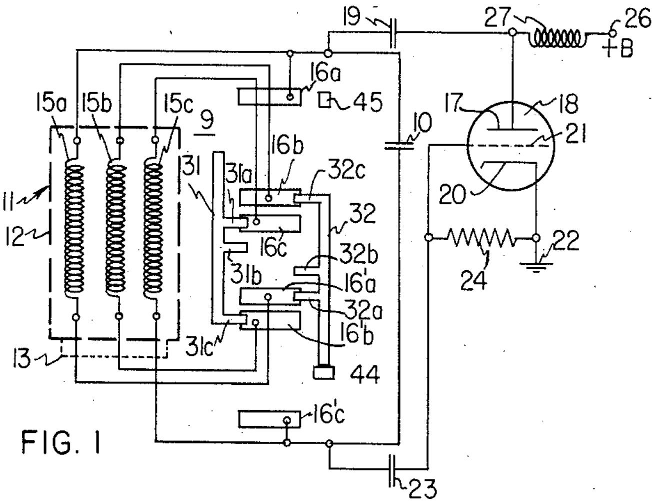
Fig. 1 is a schematic diagram of a circuit which may be employed in a wave signal receiver which comprises a resonant frequency varying device including the band switching arrangement of the present invention shown in the position for receiving the low frequency band.
Figure 3:
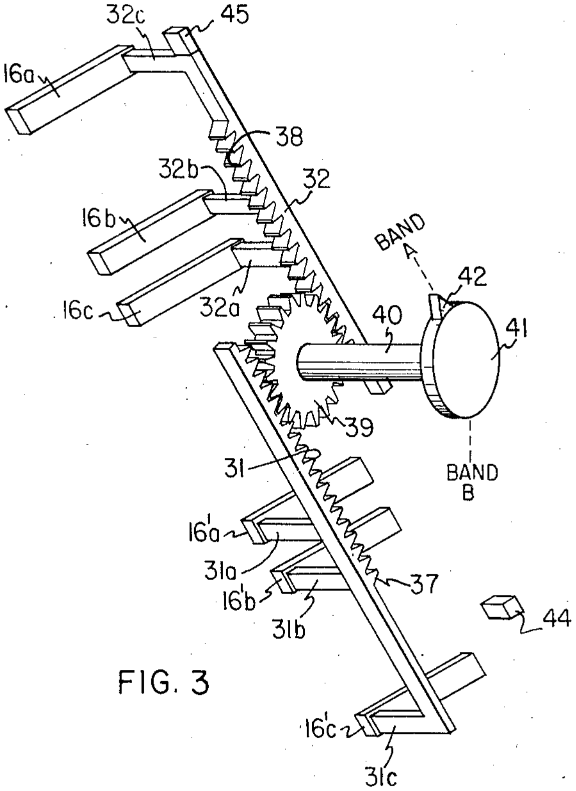
Figure 4:
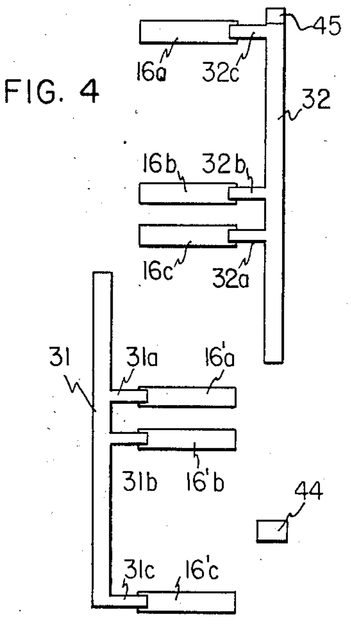

Fig. 3 is a perspective view of a switching mechanism for performing a band switching operation on the resonant frequency varying device of Fig. 1; and Fig. 4 is a schematic diagram of a portion of Fig. 1, showing the other switching position of the band switching arrangement not shown in Fig. 1 of the drawing, or in other words, showing the position of the band switching arrangement for receiving the high frequency band.

Although the present invention is broadly concerned with a variable inductance, it is particularly applicable to resonant frequency varying devices employed in modern wave signal receivers. Accordingly, and by way of example only, the present invention has been illustrated as applied to such resonant frequency varying circuits, but it should be understood that it may be applicable to other fields.

Referring now to Fig. 1 of the drawing, there is illustrated a tuned circuit, generally indicated at 9, comprising a capacitor 10 of relatively fixed capacitive reactance and an inductance generally indicated at 11 capable of providing a selectively variable inductive reactance.

Figure 2:
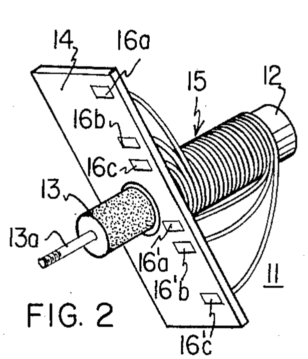
Fig. 2 is a perspective view of a variable inductance comprising a movable ferromagnetic core such as is schematically shown in Fig. 1.

As is best shown in Fig. 2 of the drawing, the variable inductance 11 comprises a suitable coil support 12, illustrated as a tubular insulating member for receiving therewithin a movable ferromagnetic core 13 preferably formed of a compressed comminuted ferromagnetic material such as powdered iron or the like. The core 13 preferably is provided with a threaded extension $13_a$ which may be connected to suitable means for moving the core 13. For the purpose of suitably mounting the coil support 12 there is provided a strip-like member 14 preferably formed of an insulating material. Any suitable means for rigidily interrelating the coil support 12 and the strip-like member 14 in the manner shown in Fig. 2 of the drawing may be employed. The tubular coil support 12 has suitably wound thereon a coil generally designated at 15, which, as illustrated in Fig. 1 of the drawing, comprises three separate windings $15_a$, $15_b$ and $15_c$, each wound on the tubular coil support 12 so that if the windings are connected in parallel they tend to produce mutually aiding magnetic fluxes. The ends of each of the winding sections $15_a$, $15_b$ and $15_c$ of the coil are connected to suitable terminals $16_a$—$16'_a$, $16_b$—$16'_b$ and $16_c$—$16'_c$, respectively, which terminals are illustrated as being suitably mounted on the strip-like member 14 in a predetermined manner to be described hereinafter.

It will be understood that the tuned circuit 9, the resonant frequency of which may be selectively varied by movement of the ferromagnetic core 13, may be employed in various circuits. In Fig. 1 the tuned circuit 9 is illustrated as being employed in an oscillator circuit which may comprise one stage of a superheterodyne type of wave signal receiver. As illustrated in Fig. 1 of the drawing, the tank circuit 9 has one terminal thereof connected to the anode or plate 17 of an electron discharge valve 18, illustrated as a triode, through a coupling capacitor 19. The electron discharge valve 18 further comprises a cathode 20 and a grid or control electrode 21. The cathode 19 is illustrated as being connected to ground generally indicated at 22. The other terminal of the tank circuit 9 is connected to the control electrode 21 through a suitable coupling capacitor 23. A grid leak resistor 24 is indicated as connected between the control electrode 21 and ground 22. The plate 17 of the triode 18 is also connected to a source 26 of +B potential through a choke coil 27. It will be understood that by changing the position of the ferromagnetic core 13 of the variable inductance 11 relative to the coil 15 the resonant frequency of the tank circuit 9 may be selectively changed so that the frequency of the output signal of the oscillator circuit shown in Fig. 1 of the drawing may also be selectively changed.

As was mentioned above, the resonant frequency of a tuned circuit of the type disclosed at 9 in Fig. 1 of the drawing increases substantially by a factor of three while the core 13 is moved from the core-all-in position to the core-all-out position. This means that for this range the inductance must change inversely by a factor of nine. In accordance with the present invention the three windings $15_a$, $15_b$ and $15_c$ of the coil 15 are arranged to be selectively connected either in series or in parallel. When the windings are connected in series, the inductive reactance of the coil 15 has been found to be approximately nine times larger for the same core position as when the three windings are connected in parallel. In other words when the windings $15_a$, $15_b$ and $15_c$ are connected in parallel and the core 13 is in the core-all-in position the inductive reactance of the coil 15 is substantially the same as when the windings $15_a$, $15_b$ and $15_c$ are connected in series and the core 13 is in the core-all-out position. Consequently, the inductance of the coil may be controlled over two contiguous frequency bands thereby providing a resonant frequency range substantially twice that of conventional permeability tuned circuits.

Any suitable mechanism may be provided for selectively connecting the winding sections $15_a$, $15_b$ and $15_c$ of the coil 15 either in series or in parallel. As illustrated the terminals $16_a$, $16_b$, $16_c$, $16'_a$, $16'_b$ and $16'_c$ are arranged in that order on the strip-like member 14 with a predetermined spacing therebetween. The terminals $16_a$ and $16'_c$ are spaced a substantial distance from the adjacent terminals $16_b$ and $16'_b$ respectively. The terminals $16_b$ and $16_c$ and $16'_a$ and $16'_b$ are spaced relatively close together with a substantial distance between the terminals $16_c$ and $16'_a$, this distance actually being the same as the spacing between the end terminals $16_a$ and $16'_c$ and the adjacent terminals $16_b$ and $16'_b$ respectively. By employing this particular spacing of the terminals 16 a pair of switching members specifically designated as 31 and 32 in the drawing which are identical in construction may be employed. The movable switching members 31 and 32 are provided with suitable contacting portions so that when in the position shown in Fig. 1 of the drawing the winding sections $15_a$, $15_b$ and $15_c$ are connected in series while when in the position shown in Fig. 4 of the drawing the winding sections $15_a$, $15_b$ and $15_c$ are connected in parallel.

As illustrated the switching member 31 is provided with a plurality of spaced contact means $31_a$, $31_b$ and $31_c$. These spaced contact means are positioned in a predetermined manner relative to the spacing of the terminals 16 so that when the movable switching element 31 is in the position shown in Fig. 1 of the drawing the contact portion $31_a$ engages terminal $16_c$ while the contact portion $31_c$ engages terminal $16'_b$. The contact portion $31_b$ does not engage any contact in this position of the switching member 31. In the other position of the switching element 31 shown in Fig. 4 of the drawing the contacting portions $31_a$, $31_b$ and $31_c$ of the switching element 31 engage terminals $16'_a$, $16'_b$ and $16'_c$, respectively, thereby connecting in parallel the corresponding ends of the winding sections $15_a$, $15_b$ and $15_c$.

The switching element 32 is provided with identical contact portions $32_a$, $32_b$ and $32_c$. In the position shown in Fig. 1 of the drawing the contact portion $32_a$ is in engagement with the terminal $16'_a$ while the contact portion $32_c$ is in contacting engagement with the terminal $16_b$. The contact portion $32_b$ does not engage any contact in this position of the switching member 32. It will be apparent that in this Fig. 1 position of the switching elements 31 and 32 the winding sections of the coil 15 are connected in series relationship. In the other position of the switching element 32 shown in Fig. 4 of the drawing the contacting portions $32_c$, $32_b$ and $32_a$ are adapted to engage with the terminals $16_a$, $16_b$ and $16_c$ respectively, thereby connecting in parallel the other ends of the winding sections of the coil 15.

It will be understood that simultaneous movement of the switching elements 31 and 32 should occur so that the elements are in either of the two positions shown in Figs. 1 and 4 of the drawing. Any suitable means for producing such simultaneous movement may be provided. In Fig. 3 one such means is illustrated in which the switching elements 31 and 32 are provided along their adjacent parallel surfaces with teeth so as to define rack portions 37 and 38. A suitable gear 39, preferably formed of some insulating material and mounted on a suitable shaft 40, is adapted simultaneously to engage with the rack portions 37 and 38. The rack portions 37 and 38 and the gear 39 will be so designed that movement of the switching elements from the position shown in Fig. 1 to the position shown in Fig. 4 of the drawing is accomplished with less than 360° rotation of the gear 39. If desired the shaft 40 may be provided with a suitable manually engageable knob 41 having a pointer 42 thereon for cooperating with suitable indicia such as band A and band B indicating the two band switching positions.

In order to limit the extreme positions of the switching elements 31 and 32 suitable stop elements such as 44 and 45 may be provided. As illustrated the stop elements 44 and 45 are adapted to limit the movement in either direction of the switching element 32, this element being shown against the stop 44 in Fig. 1 of the drawing and against the stop 45 in Fig. 4 of the drawing.

In view of the detailed description included above the operation of the permeability tuning device of the present invention incorporating the band switching element will be understood by those skilled in the art. By a simple switching mechanism the winding sections $15_a$, $15_b$ and $15_c$ of the coil 15 with which the movable ferromagnetic core 13 is associated may be connected either in series or in parallel. When connected in series the tuning circuit operates in the lower frequency band and when connected in parallel the tuned circuit operates in the higher frequency band. As has been mentioned above these frequency bands are adjacent or contiguous bands with the high frequency point on the low frequency band corresponding substantially to the low frequency point on the high frequency band.

Although there has been illustrated a specific embodiment of the present invention, it should be understood that various modifications will occur to those skilled in the art. Accordingly it is aimed in the appended claims to cover all such changes and modifications as fall within the true spirit and scope of the present invention.

What is desired to be secured by Letters Patent of the United States is:

1. A resonant frequency varying device comprising a variable inductance including an insulating tube, a terminal board associated with said tube, a coil comprising a plurality of parallel conductors wound on said tube, a plurality of pairs of terminals one pair for each of said conductors mounted in spaced relationship on said terminal board, means for connecting the ends of each conductor wound on said tube to the associated pair of terminals, switching means associated with said terminals for controlling the connections of said windings so that when said switching means is in one position said conductors are connected in series, and when said switching means is in another position said conductors are connected in parallel, and a ferromagnetic core disposed within said tube and movable along the axis for varying the resonant frequency of said device.

2. A resonant frequency varying device comprising a variable inductance including an insulating tube, a terminal board associated with said tube, a coil comprising a plurality of parallel conductors wound on said tube, a plurality of pairs of terminals one pair for each of said conductors mounted in spaced relationship on said terminal board, means for connecting the ends of each conductor wound on said tube to the associated pair of terminals, switching means associated with said terminals for controlling the connections of said windings so that when said switching means is in one position said conductors are connected in series, and when said switching means is in another position said conductors are connected in parallel, a ferromagnetic core disposed within said tube and movable along the axis for varying the resonant frequency of said device, and means for limiting the movement in each direction of said switching means.

3. A resonant frequency varying device comprising a variable inductance including an insulating tube, a coil comprising a plurality of parallel conductors wound on said tube, a plurality of pairs of terminals, one pair for each of said conductors, means for connecting the ends of each conductor wound on said tube to the associated pair of terminals, switching means associated with said terminals for controlling the connections of said windings so that when said switching means is in one position said conductors are connected in series, and when said switching means is in another position said conductors are connected in parallel, and a ferromagnetic core disposed within said tube and movable along the axis for varying the resonant frequency of said device.

EDWARD F. DE MERS.

REFERENCES CITED

The following references are of record in the file of this patent:

UNITED STATES PATENTS

| Number | Name | Date |
|---|---|---|
| 1,127,738 | Coughenour | Feb. 9, 1915 |
| 2,322,722 | Wentworth | June 22, 1943 |
| 2,431,438 | Wentworth | Nov. 25, 1947 |

FOREIGN PATENTS

| Number | Country | Date |
|---|---|---|
| 101,016 | Australia | May 20, 1937 |